United States Patent [19]
Chung et al.

[11] Patent Number: 5,982,224
[45] Date of Patent: Nov. 9, 1999

[54] LOW-POWER CHARGE PUMP CIRCUIT HAVING REDUCED BODY EFFECT

[75] Inventors: Hwi-Taek Chung, Suwon; Kang-Doeg Suh, Ahnyang-shi, both of Rep. of Korea

[73] Assignee: Samsung Electronics Co., Ltd., Rep. of Korea

[21] Appl. No.: 09/158,379

[22] Filed: Sep. 22, 1998

[51] Int. Cl.[6] .................................. G05F 1/10; G05F 3/02
[52] U.S. Cl. .......................... 327/536; 327/534; 327/589; 363/59; 307/110
[58] Field of Search .................................... 327/534–537, 327/589, 590; 363/59, 60; 307/110

[56] References Cited

U.S. PATENT DOCUMENTS

| | | | |
|---|---|---|---|
| 4,935,644 | 6/1990 | Tsujimoto | 327/536 |
| 4,970,409 | 11/1990 | Wada et al. | 327/541 |
| 5,489,870 | 2/1996 | Arakawa | 327/536 |
| 5,625,544 | 4/1997 | Kowshik et al. | 363/59 |
| 5,675,279 | 10/1997 | Fujimoto et al. | 327/536 |
| 5,812,018 | 9/1998 | Sudo et al. | 327/537 |
| 5,831,844 | 11/1998 | Sudo | 363/60 |

OTHER PUBLICATIONS

Dickson, "On–Chip High–Voltage Generation in MNOS Integrated Circuits Using an Improved Voltage Multiplier Technique," IEEE Journal of Solid–State Circuits, vol. SC–11, No. 3, pp. 374–378, Jun. 1976.

*Primary Examiner*—Timothy P. Callahan
*Assistant Examiner*—An T. Luu
*Attorney, Agent, or Firm*—Lappin & Kusmer LLP

[57] ABSTRACT

A charge pump circuit comprises an input terminal for receiving an input voltage, an output terminal for providing an output voltage, and a plurality of pump stages connected in series between the input and output terminals and alternately coupled to first and second clock signals having complementary states. Each of the pump stages includes a transistor having a gate terminal, a source terminal, a drain terminal, and a bulk terminal, and a capacitor connected between the gate terminal of the transistor and a corresponding one of the clock signals. Each bulk terminal is biased by the voltage of a previous pump stage driven by the same clock signal, so that each of the corresponding threshold voltages of the transistors is suppressed to a voltage sufficient for generating a higher voltage on a low power supply voltage regardless of body effect.

9 Claims, 4 Drawing Sheets

નોટ: ## LOW-POWER CHARGE PUMP CIRCUIT HAVING REDUCED BODY EFFECT

BACKGROUND OF THE INVENTION

Many non-volatile memory devices, such as electrically erasable programmable read-only memories (EEPROMs), EPROMs, and FLASH EPROM memories, require relatively high voltage potentials for writing or erasing information, typically in the range of approximately 12–20 Volts. Because power supplies of contemporary digital systems supply a much lower voltage, for example 2–5 Volts, various methods of high-voltage generation have been used to "pump up", or increase, the power supply voltage Vcc to the potential required by non-volatile memories.

FIG. 1 illustrates a conventional charge pump circuit 10 used for high-voltage generation. The charge pump circuit 10, commonly referred to as "voltage multiplier," increases (or "pumps up") the amplitude of the power supply voltage Vcc to a programming/erase voltage Vpp required by non-volatile memories.

The charge pump circuit 10 comprises several pump stages 11, 12, 13, 14, and 15 connected in series. Pump stage 15 represents the nth pump stage. Each pump stage 11, 12, 13, 14, and 15 respectively comprises capacitors C1, C2, C3, C4, and Cn connected to respective gate terminals of diode-connected NMOS transistors MN2, MN3, MN4, MN5 and MN$n$. The power supply voltage Vcc is coupled through a diode-connected NMOS transistor MN1 to a source of transistor MN2 of the first pump stage 11. The pumped up output voltage Vout is received from a drain of the transistor MN$n$ in the nth pump stage 15. Each of the pump stages 11, 12, 13, 14, and 15 is coupled to one of a pair of complementary clock signals P1 and P2 (refer to FIG. 2) through capacitors C1, C2, C3, C4, and Cn, respectively.

During operation, the capacitors C1, C2, C3, C4, and Cn are successively charged and discharged during each half of the clock signal. Specifically, capacitor C1 is charged through the diode-connected NMOS transistor MN1 as the clock signal P1 transitions to a low level, and capacitor C3 is charged via the current path through capacitor C2, the diode-connected NMOS transistor MN3 and positive-transitioning clock P2. Charge is transferred from capacitor C1 to capacitor C2 through the diode-connected NMOS transistor MN2 when the clock signals P1 and P2 reverse polarity. Charge transfer is constrained by transistors MN1 . . . MN$n$ to be in a direction from left to right.

As capacitors C1, C2, C3, C4, and Cn are successively charged and discharged, packets of charge are "pumped" along the diode-connected NMOS transistors MN1 . . . MN$n$. The average voltage potential at the drains of the diode-connected NMOS transistors MN1 . . . MN$n$ increases progressively from stage 11 to the output Vout of the diode-connected NMOS transistor chain. Thus, the voltage generated at the drain of the diode-connected NMOS transistor MN$n$ at node Vout has a greater amplitude than the power supply voltage Vcc. When the power supply voltage is 5 Volts, the charge pump circuit 10 is sufficient for generating the high voltages required by non-volatile memories. In this scenario, for example, approximately 10 pump stages are utilized.

In the conventional embodiment, the bulk-to-source voltage Vsb increases as the power supply voltage Vcc is pumped up through the pump stages, causing respective threshold voltages Vts of the diode-connected NMOS transistors MN1 . . . MN$n$ to be increased, as shown in FIG. 3, according to a phenomenon known as "body effect" (sometimes referred to as a substrate bias effect). The body effect causes the conductance of a transistor to decrease, that is, it increases the threshold voltages Vt of each transistor. As conduction of the transistors decreases, the upper pump stages, for example stage 15, become highly resistive, which severely limits current.

Thus, there is a need for a charge pump circuit capable of generating the high voltages required by non-volatile memories from a low power supply voltage without incrementally increasing threshold voltage.

SUMMARY OF THE INVENTION

The present invention relates to charge pumps used for providing high voltages to integrated circuit memory devices and more particularly to charge pumps which operate on low power supply voltage.

It is an object of the present invention to provide a low power charge pump circuit having improved efficiency in a manner which mitigates or eliminates the body effect exhibited by conventional architectures.

In order to attain the above object, according to an aspect of the present invention, a charge pump circuit is provided. The charge pump circuit comprises an input terminal for receiving an input voltage, an output terminal for outputting an output voltage, and a plurality of pump stages connected in series between the input and output terminals and alternately coupled to first and second complementary clock signals.

Each of the pump stages includes a transistor having a gate terminal, a source terminal, a drain terminal and a bulk terminal, and a capacitor connected between the gate terminal of the transistor and a corresponding one of the clock signals. Each transistor bulk terminal in the pump stages is biased by a voltage which is increased by a previous pump stage using the same clock signal.

According to the charge pump circuit of the invention, each transistor threshold voltage is maintained at a voltage sufficient for generating a higher voltage on a low power supply voltage regardless of body effect.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 4:
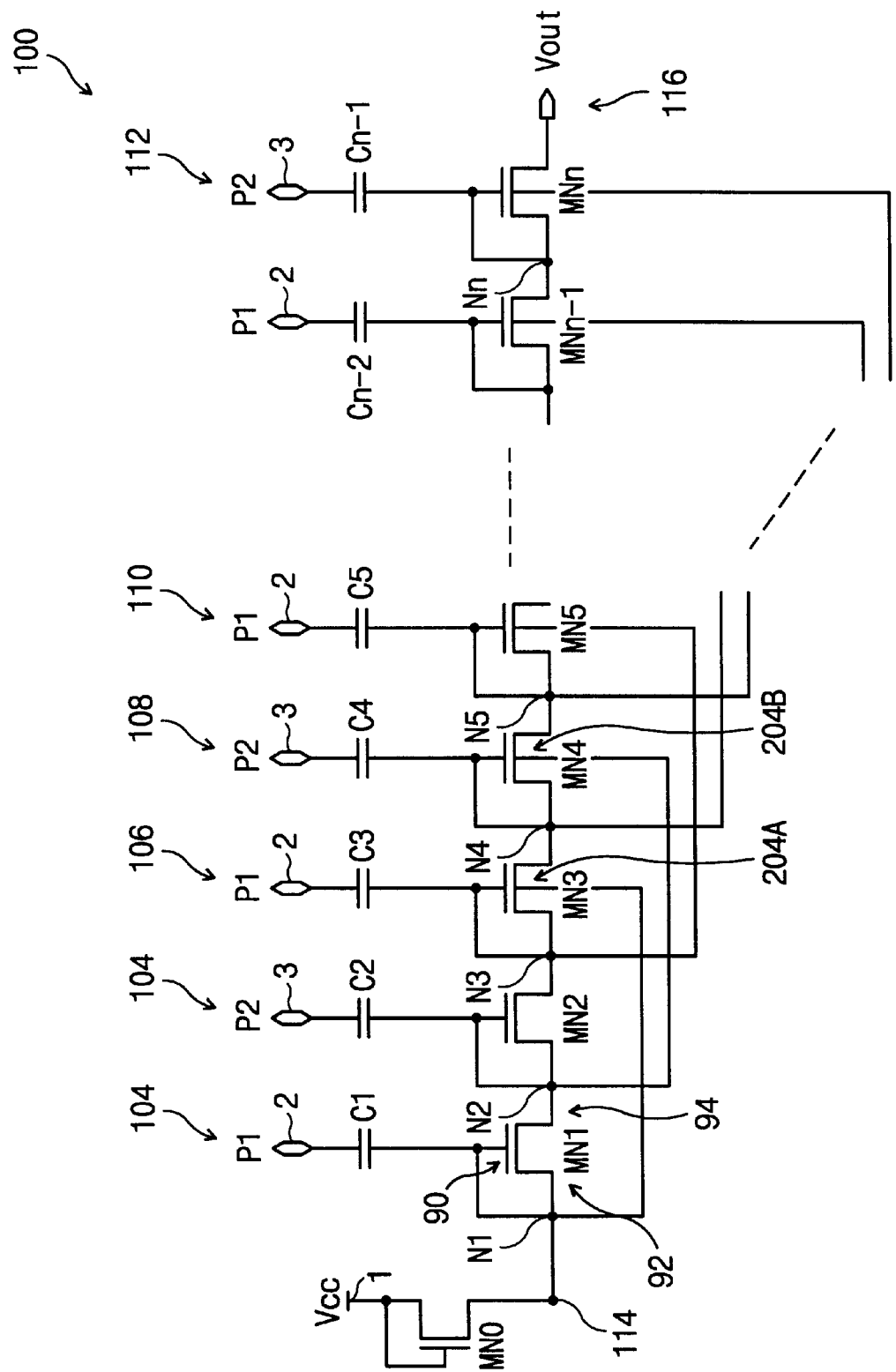
FIG. 4 is a schematic diagram of a charge pump circuit according to a first preferred embodiment of the present invention.

FIG. 4 illustrates a charge pump circuit 100 according to a first preferred embodiment of the present invention. The charge pump circuit 100 is adapted for increasing the amplitude of a relatively low power supply voltage Vcc to provide a relatively high output voltage Vout. For purposes of this description, the low power supply voltage Vcc is a voltage of less than 5 Volts. The resulting output voltage Vout corresponds to the high voltage level Vpp that is required by non-volatile memories.

Figure 2:
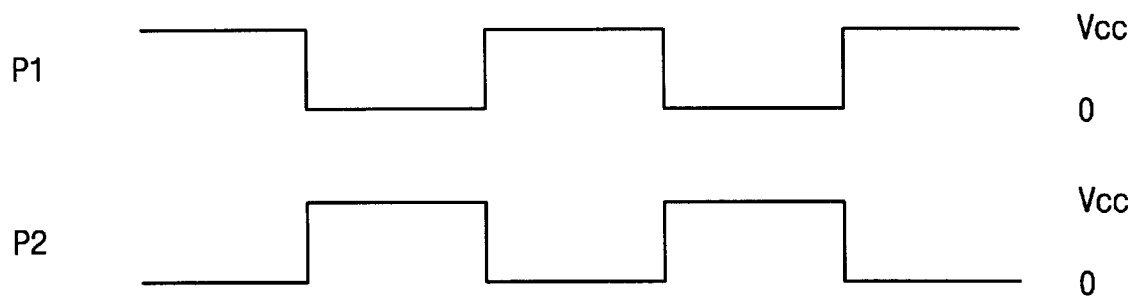
FIG. 2 is a waveform diagram of clock signals employed in the charge pump circuit of the present invention.
Figure 3:
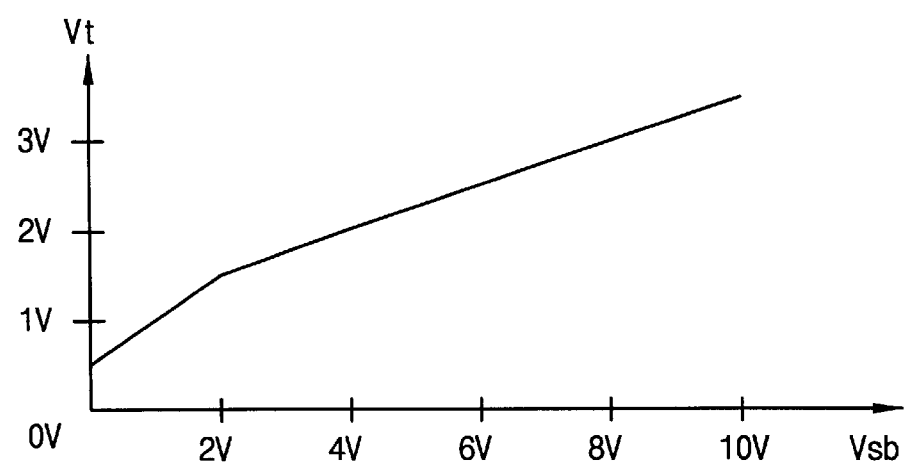
FIG. 3 is a chart of the relationship of threshold voltage as a function of bulk-to-source voltage.

The charge pump circuit 100 increases or pumps up the amplitude of the power supply voltage Vcc to the level of a programming/erase voltage Vpp required by non-volatile memories, and is made up of several pump stages 102, 104, 106, 108, 110, and 112 connected in series between an input terminal 114 and an output terminal 116. Pump stage 112 represents the nth pump stage. Each pump stage 102, 104, 106, 108, 110, and 112 respectively comprises capacitors C1, C2, C3, C4, C5, and Cn and transistors MN1, MN2, MN3, MN4, MN5, and MNn. The transistors MNn have gate terminals 90 connected to one of a pair of clock signals P1 and P2 through the corresponding capacitors Cn, drain terminals 92 connected to their gates 90 which provide a diode finction of unidirectional conductivity from drain 92 to source 94, and source terminals 94 connected to the drain terminals 92 of adjacent transistors MNn. The drain terminal 92 of transistor MN1 of the first pump stage 102 is coupled to the input terminal 114, which is precharged at approximately the power supply voltage Vcc through a diode-connected NMOS transistor MN0 operating as a precharge transistor. The source terminal of the transistor MNn of the final stage 112 is coupled to the output terminal 116 for providing the boosted output voltage Vpp. Each pump stage 102 . . . 112 is coupled to one of the pair of complementary clock signals P1 and P2 through the corresponding capacitors C1 . . . Cn, respectively. Waveforms of the complementary clock signals P1 and P2 are depicted in FIG. 2.

In the charge pump circuit 100 according to the first preferred embodiment of the present invention, as illustrated in FIG. 4, bulks 204A, 204B (or pocket p-wells 204 in FIG. 5) of the transistors MN3, MN4 . . . MNm, of the third to nth pump stages 106 . . . 112 are connected to gate/drain junctions N1, N2, N3 . . . of the previous pump stages employing the same clock signal, respectively. That is, each of the bulks of the transistors MN3 . . . MNm is biased by the voltage pumped up by the previous pump stages. For example, the bulk 204A NMOS transistor MN3 of pump stage 106 is connected to the gate/drain junction N1 of transistor MN1 of pump stage 102. The bulk 204B of the diode-connected NMOS transistor MN4 of pump stage 108 is connected to gate/drain junction N2 of the diode-connected NMOS transistor MN2 of pump stage 104. Other pump stages are likewise constructed in a similar manner. Bulks of the transistors MN1 and MN2 of pump stages 102 and 104 are grounded (not shown).

Figure 5:
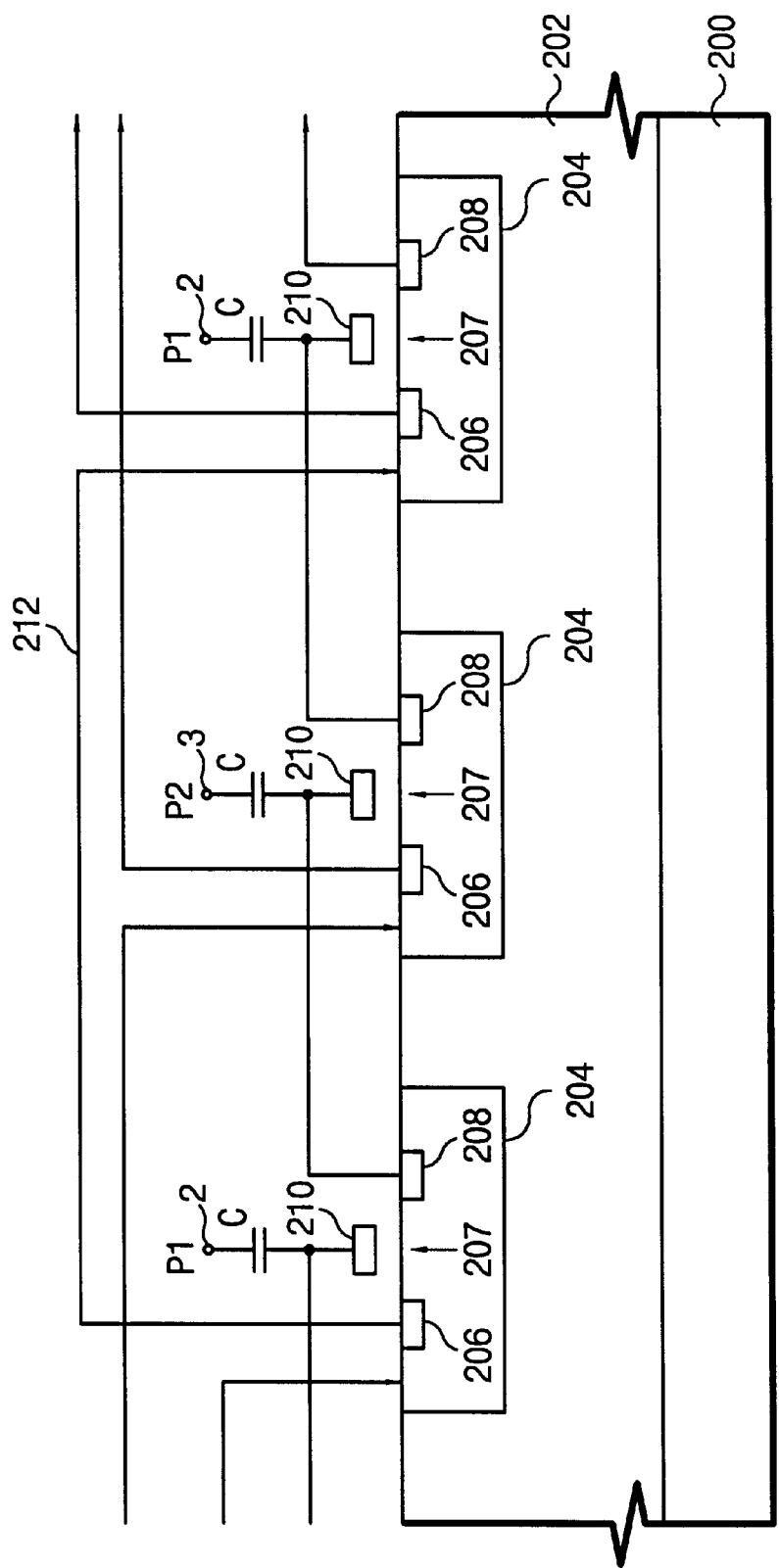
FIG. 5 is a simplified cross section of a semiconductor device driven by a charge pump circuit in accordance with a first embodiment of the present invention.

FIG. 5 is a simplified cross section of a semiconductor device employed in the charge pump circuit according to a first preferred embodiment of the present invention. The charge pump circuit 100 is fabricated by a triple well process well known in the art. Referring to FIG. 5, in a semiconductor substrate 200 of p-type conductivity, an n-type well 202 is fabricated using well known semiconductor precess technology. In the n-type well 202, a plurality of pocket p-wells 204 are formed to be spaced apart from each other. In each pocket p-well 204, an NMOS transistor is integrated having a drain 206 and a source 208 spaced apart from each other, a channel 207 formed between the drain 206 and source 208, and a gate 210 disposed both between the drain 206 and source 208 and on the channel 207. The transistor gates 210 are alternately connected to the clock signals P1 and P2 through corresponding capacitors C. Each corresponding capacitor and transistor pair forms a pump stage. The gates 210 and drains 206 of respective transistors are connected together so as to operate as a diode. The respective pocket p-wells 204 are connected to gate/drain junctions of previous pump stages using the same clock signal via wiring 212.

The operation of the charge pump circuit 100 according to the first preferred embodiment of the present invention will now be described in detail with reference to FIGS. 4 and 5. During operation of the charge pump circuit 100 in FIG. 4, when the clock signal P1 cycles to a low state (e.g., a ground voltage), the drain 92 of transistor MN1, that is, the capacitor C1 of pump stage 102,is charged through via precharge NMOS transistor MN0 to a level of Vcc−VtMN0, wherein Vcc is the power supply voltage and VtMN0 is the threshold voltage of the transistor MN0. When the phases (or states) of the clock signals P1 and P2 transition, capacitor C2 is charged via the transistor MN1 by discharging charged capacitor C1 of previous pump stage 102. At this time, the voltage corresponding to the discharged charge, that is the voltage at the gate/drain junction N2 of transistor MN2, is expressed as:

$$(Vcc-VtMN0)+(\alpha \times Vcc-VtMN1) \tag{1}$$

wherein VtMN0 represents the threshold voltage of transistor MN0, α represents a value of charge sharing between the capacitor C1 and a gate/drain junction N1 of the transistor MN1, and VtMN1 represents a threshold voltage of transistor MN1. The value α is expressed as:

$$\alpha = \frac{C1}{C1 + C1'} \tag{2}$$

wherein C1′ represents the gate/drain junction capacitance of transistor MN1.

When the phases (or states) of clock signals P1 and P2 transition, that is, when clock signal P1 transitions to a low state and clock signal P2 transitions to a high state, transistors connected to clock signal P1 through associated capacitors will be blocked and transistors connected to clock signal P2 through associated capacitors will be conductive. As a result, capacitor C3 of pump stage 106 is charged via the path through capacitor C2, the transistor M102, and positive-transitioning clock signal P2, and a voltage corresponding to the charge is expressed as:

$$(Vcc-VtMN0)+(\alpha \times Vcc-VtMN1)+(\alpha \times Vcc-VtMN2) \tag{3}$$

Wherein VtMN2 represents the threshold voltage of transistor MN2 of pump stage 104. At this time, the transistor MN1 of pump stage 102 serves as a means for blocking reverse current flow from the gate/drain junction N2 of pump stage 104 to the gate/drain junction N1 of pump stage 102. As mentioned above, because the clock signals P1 and P2 are periodic, the transistors having an even index MN2, MN4 . . . , and the transistors having an odd index MN1, MN3, MN5 . . . , will be periodically blocked or conductive. Charge is then pumped, via a conductive transistor, from one capacitor to the next capacitor having a higher index. The total output voltage Vout obtained is expressed as:

$$Vpp = (Vcc-VtMN0) + (\alpha Vcc-VtMN1) + \ldots + (\alpha Vcc-MNn) \tag{4}$$

Figure 1:
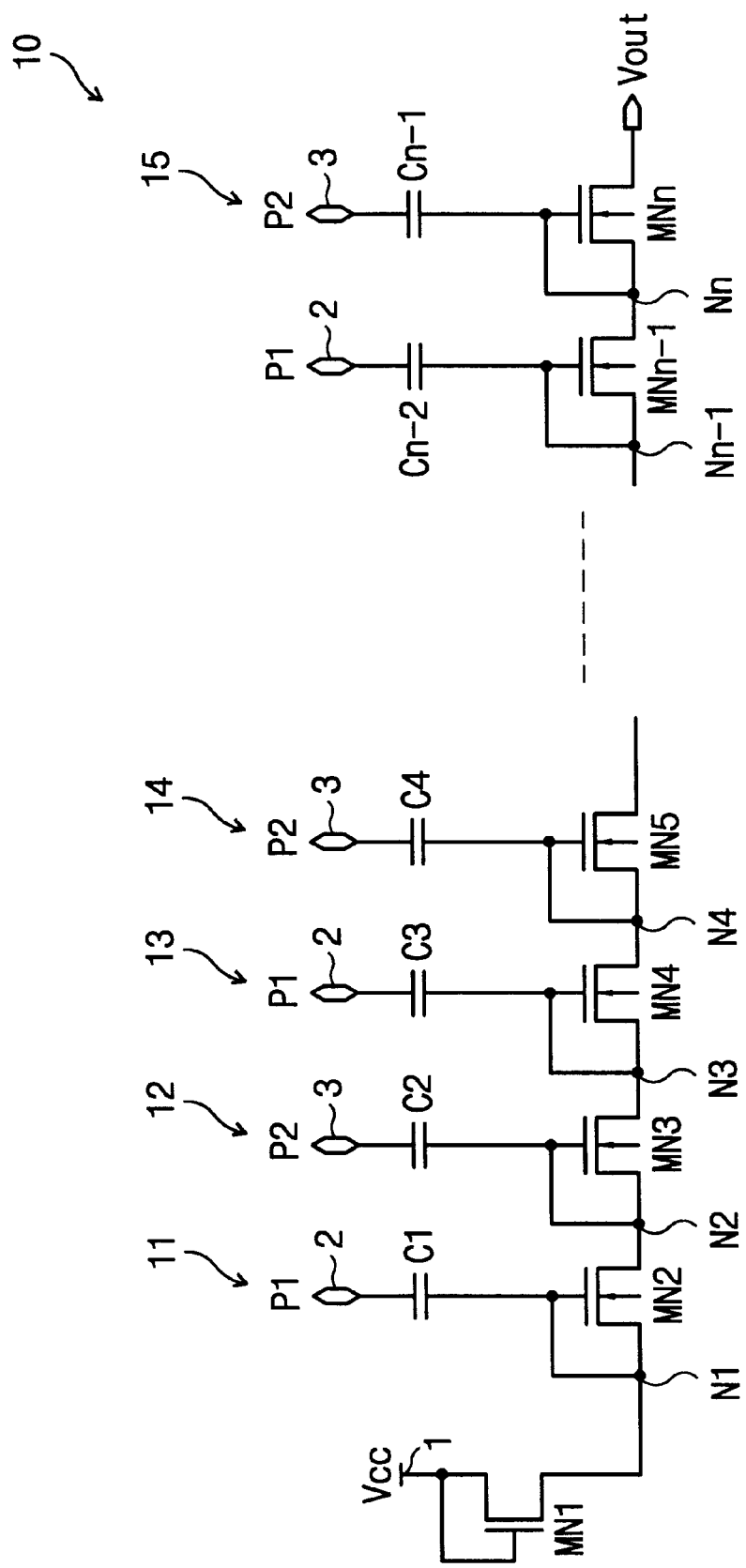
FIG. 1 is a schematic diagram of a conventional charge pump circuit.

In a case of the conventional charge pump circuit 10 of FIG. 1, as mentioned above, the threshold voltages of the transistors MN1 . . . MNn are increased according to the body effect as the power supply voltage Vcc is pumped up from stage to stage, as the bulk of each transistor is biased with a constant voltage (e.g., the ground voltage) and their source voltages are progressively increased.

On the contrary, in the case of the inventive charge pump circuit 100 of FIG. 4, bulks 204A, 204B (or pocket p-wells 204 in FIG. 5) of transistors constituting the third through nth pump stages 106 . . . 112 are connected to gate/drain junctions N1, N2 . . . of transistors of previous pump stages which use the same clock signal P1, P2. Under this circuit configuration, when clock signal P1 transitions from a low state to a high state, capacitors C2, C4 . . ., of the next pump stages 104, 108, . . . , connected to the clock signal P2 (transitioning to a low state) are charged. At the same time, bulks (or pocket p-wells 204 in FIG. 5) of transistors MN3, MN5 . . . of pump stages 106, 110, . . . are biased by voltages pumped up by previous pump stages using the same clock signal (e.g., the clock signal P1). When the phases (or states) of the clock signals P1 and P2 transition, the roles reverse, and, capacitors C1, C3, and C5, . . . are charged and bulks (or pocket p-wells 204 in FIG. 5) of transistors MN4, MN6, . . . are biased by voltages pumped up at previous pump stages using the same clock signal (e.g., the clock signal P2).

For example, bulk 204A of transistor MN3 of pump stage 106 is biased with a voltage of Vcc−VtMN0 of the gate/drain junction N1 of transistor MN1 of pump stage 102, and the source of transistor MN3, that is, the capacitor C104, is charged to a voltage expressed by equation (3). In the case of the conventional architecture, a source-to-bulk voltage Vsb of the transistor MN3 is at a voltage expressed by equation (3), while in the case of the present invention, the voltage Vsb is at a voltage of V1−V2 (2αVcc−VtMN1−VtMN2−VtMN3), wherein V1 is a voltage according to the equation (3) and V2 is a voltage at the gate/drain junction N1 of transistor MN1 of pump stage 102. Source-to-bulk voltages of the transistors of the remaining pump stages may be calculated in a similar manner. Therefore, because the bulks, that is, pocket p-wells 204, of the transistors of pump stages 106, 110, and 112 are biased by voltages pumped up by previous pump stages, instead of the ground voltage, increase of their threshold voltages is suppressed, and a high output voltage Vout is achieved with a low power supply voltage Vcc, while mitigating and/or eliminating the body effect.

While this invention has been particularly shown and described with references to preferred embodiments thereof, it will be understood by those skilled in the art that various changes in form and details may be made therein without departing from the spirit and scope of the invention as defined by the appended claims.

For example, the present invention may be employed for generating a negative voltage. In this case, the diode-connected NMOS transistors of FIG. 4 comprise diode-connected PMOS transistors, and bulks (or pocket n-wells) of transistors in the third through nth pump stages are connected to gate/drain regions of transistors of previous pump stages using the same clock signal, as described above.

What is claimed is:

1. A charge pump circuit comprising:

an input terminal for receiving an input voltage;

an output terminal for providing an output voltage; and a plurality of pump stages connected in series between the input and output terminals; each of the pump stages including a transistor having a gate terminal, a source terminal, a drain terminal and a bulk terminal, and a capacitor connected between the gate terminal of the transistor and a corresponding one of first and second clock signals, capacitors of alternate stages being alternately coupled to the first and second clock signals having complementary states, the source and gate terminals of each transistor being coupled at a reference node;

each transistor bulk terminal, for pump stages other than first and second pump stages in the series being coupled to the reference node of a previous stage driven by a like first or second clock signal, such that the bulk terminal is biased by the voltage of the previous reference node.

2. The charge pump circuit according to claim 1, wherein said transistors each comprise a diode-connected NMOS transistor.

3. The charge pump circuit according to claim 2, wherein said transistors each are formed in P-type pocket wells spaced from each other in an N-type well of a semiconductor substrate in accordance with a triple well process.

4. The charge pump circuit according to claim 1, wherein said bulk terminals of the transistors constituting the first and second pump stages are grounded.

5. The charge pump circuit according to claim 1, further comprising a precharge transistor connected between the input terminal and a power supply voltage, for providing the input voltage as a precharge voltage of the input terminal.

6. The charge pump circuit according to claim 5, wherein said input voltage is a voltage of Vcc−Vth, Vcc being the power supply voltage and Vtn being a threshold voltage of the precharge transistor.

7. The charge pump circuit according to claim 1, wherein said capacitors each comprise a capacitor-connected field effect transistor.

8. The charge pump circuit according to claim 1, wherein said transistors each comprise a diode-connected PMOS transistor.

9. The charge pump circuit according to claim 8, further comprising a precharge transistor connected between the input terminal and a ground voltage, for providing the input voltage as a precharge voltage of the input terminal.

* * * * *